(12) United States Patent
Arai

(10) Patent No.: US 7,123,131 B2
(45) Date of Patent: Oct. 17, 2006

(54) IN-CAR VIDEO SYSTEM

(75) Inventor: Hiroyuki Arai, Tokyo (JP)

(73) Assignee: Sony Corporation, (JP)

( * ) Notice: Subject to any disclaimer, the term of this patent is extended or adjusted under 35 U.S.C. 154(b) by 219 days.

(21) Appl. No.: 10/959,464

(22) Filed: Oct. 6, 2004

(65) Prior Publication Data
US 2005/0116879 A1 Jun. 2, 2005

(30) Foreign Application Priority Data

Oct. 7, 2003 (JP) ............................ P2003-348280
Aug. 18, 2004 (JP) ............................ P2004-238159

(51) Int. Cl.
*B60Q 1/00* (2006.01)
*H04N 7/18* (2006.01)

(52) U.S. Cl. .................. 340/425.5; 340/525; 340/461; 340/441; 348/148; 348/837; 725/75; 725/77

(58) Field of Classification Search ............. 340/425.5, 340/525, 461; 348/148; 725/75, 77
See application file for complete search history.

(56) References Cited

U.S. PATENT DOCUMENTS 5,191,312 A * 3/1993 Altmann et al. ............ 340/441
5,404,443 A * 4/1995 Hirata ......................... 725/75
5,510,828 A * 4/1996 Lutterbach et al. ......... 725/138

FOREIGN PATENT DOCUMENTS

JP 2000-205887 A 7/2000

\* cited by examiner

*Primary Examiner*—Donnie L. Crosland
(74) *Attorney, Agent, or Firm*—Lerner, David, Littenberg, Krumholz & Mentlik, LLP

(57) ABSTRACT

An in-car video system includes a first display device installed in a front part of a car and having a first light-sensitive element to receive remote control light output from a remote control transmitter, a second display device installed in a location posterior to the first display device and having a second light-sensitive element to receive remote control light output from a remote control transmitter, and a control section for controlling the display on the first and second display devices according to output signals of the first and second light-sensitive elements. The control section includes a display operation detecting unit operable to detect an operating state of the first or second display device according to an output of the first and second light-sensitive elements, and a moving/stationary state detecting unit operable to detect whether the car is moving or stationary. When the moving/stationary state detecting unit detects that the car is moving and the display operation state detecting unit detects the operating state of the first display device, control is effected to restrict the display on the first display device so as not to induce the driver of the car to gaze at the first display device.

7 Claims, 5 Drawing Sheets

FIG. 5

|  | MOVING IMAGE DISPLAY | MENU DISPLAY |
|---|---|---|
| WHEN CAR IS MOVING | PROHIBITED | SIMPLIFIED |
| WHEN CAR IS STATIONARY | ALLOWED | STANDARD |

IN-CAR VIDEO SYSTEM

CROSS-REFERENCE TO RELATED APPLICATIONS

The present application claims priority from Japanese Application Nos. 2003-348280 filed Oct. 7, 2003 and 2004-238159 filed Aug. 18, 2004, the disclosures of which are hereby incorporated by reference herein.

BACKGROUND OF THE INVENTION

This invention relates to an in-car video system.

Among the video devices for use in a car are TV tuners, DVD (Digital Versatile Disc) players, and navigation systems. There are systems incorporating such video devices and capable of controlling two display devices (monitors).

FIG. 4 is a plan view showing an example of a car interior equipped with two display devices. The first display device is a color LCD (Liquid Crystal Display) panel 25F installed in about the center of the dashboard. The location of the color LCD panel 25F allows a driver in a driver seat DS included among the front seats and a passenger in a passenger seat PS included among the front seats to watch an image displayed on the color LCD panel 25F. The second display device is a color LCD panel 25R installed between the passenger seat PS and the driver seat DS, in the vicinity of the backrests of the two seats. The location of the color LCD panel 25R allows passengers in rear passenger seats RS to watch an image displayed on the color LCD panel 25R.

The display on the color LCD panel 25F is controlled as shown in FIG. 5 as a safety measure, that is, to prevent the driver from gazing at the display on the color LCD panel 25F or getting distracted by setting a navigation system while driving the car. As shown in FIG. 5, when the car is moving, the display of a moving image such as a TV broadcast or DVD playback is prohibited and the content of the navigation menu display is restricted, allowing only a simplified menu to be displayed. In the simplified menu, menu items used to set a destination or a route to the destination are not displayed. This is because allowing the driver to set a destination or a route to the destination when the car is moving is detrimental to safe driving.

When the car is stationary, the display of a moving image is allowed and it becomes possible to display a standard menu including all menu items for navigation.

Japanese Patent Laid Open No. 2000-205887 is a prior art reference having relevance to the above description.

As described above, system control in the in-car video system is integrated at a main unit of the system. Therefore, once some restrictions are imposed on the system operation or settings, the restrictions cannot be removed by operating from the rear passenger seats RS.

SUMMARY OF THE INVENTION

With an aim to solve the above problem in one preferred mode, this invention is directed to a video system for a car, including a first light-sensitive element installed in a location anterior to the front seats of a car and operable to receive light output from a first remote control transmitter; a second light-sensitive element installed in a location in the car posterior to the first light-sensitive element and operable to receive light output from a second remote control transmitter; a first display device installed in a location in the car anterior to the front seats; a second display device installed in a location in the car posterior to the first display device; and a control section operable to control displays on the first and second display devices according to output signals from the first and second light-sensitive elements.

In the preferred mode, the control section effects control to impose restrictions on the display on the first display device when a remote control signal is output only from the first light-sensitive element while the car is moving, to remove the restrictions on the display on the first display device when a remote control signal is output only from the first light-sensitive element while the car is stationary, and to display the result of signal processing performed in response to the remote control signal on the second display device when a remote control signal is output from the second light-sensitive element.

According to the invention, when the car is moving, even if a passenger in the front seats operates the first remote control transmitter, the content of the display on the first display device is restricted so that the content of the display is not detrimental to safe driving. When the car is stationary, the content of the display is not restricted.

Also, even if a passenger in the rear passenger seats operates the second remote control transmitter to control the second display device, that operation does not affect the first display device so that the operation is not detrimental to safe driving.

Furthermore, each of the first and second display devices can be controlled independently of the other from both the first and second remote control transmitters. When a display is controlled, a viewer of the display can recognize which one of the first and second remote control transmitters has effected the control. Still furthermore, the first and second remote control transmitters may be of an identical structure and the driver and passengers need not differentiate them.

Other and further objects, features and advantages of the invention will appear more fully from the following description.

BRIEF DESCRIPTION OF THE DRAWINGS

FIG. 5 is a table for showing the instructions for controlling the displays on the front and rear display devices.

DETAILED DESCRIPTION

[1] Configuration of the Preferred Embodiment

Figure 1:
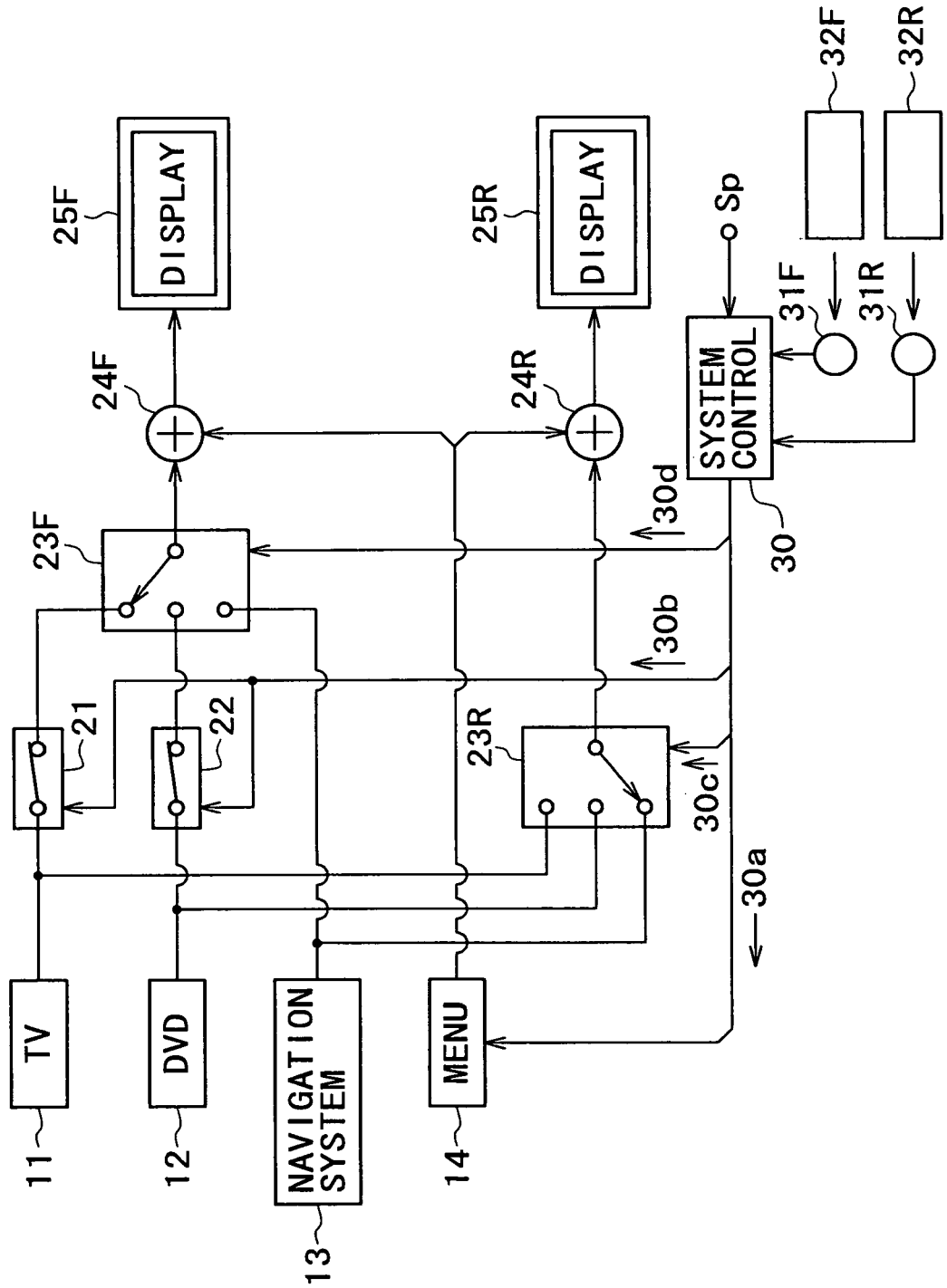
FIG. 1 is a flow diagram of an embodiment of the invention.

FIG. 1 shows an embodiment of the invention. The video system of this embodiment comprises such video devices as a TV tuner 11, a DVD player 12, a navigation system 13 and a menu signal forming circuit 14.

In this embodiment, the TV tuner 11 receives a TV broadcast and outputs a received video signal, the DVD player 12 plays back a DVD disc and outputs a playback video signal, and the navigation system 13 outputs a video signal to be displayed as a map for navigation.

The menu signal forming circuit 14 comprises a microcomputer and outputs various video signals to be displayed as menu content. The menu signal forming circuit 14 operates in two modes, one for forming video signals for the simplified menu with restricted display content and the other for forming video signals for the standard menu with unrestricted display content. In both modes, the video signals used are RGB baseband signals.

Video signals output from the TV tuner 11 and the DVD player 12 are sent to a selector circuit 23F via switching circuits 21 and 22, respectively. A video signal output from the navigation system 13 is also sent to the selector circuit 23F. At the selector circuit 23F, one of the video signals received is selected and the selected signal is sent to a synthesizing circuit 24F. When a video signal for the menu display is output from the menu signal forming circuit 14, the video signal is sent to the synthesizing circuit 24F.

At the synthesizing circuit 24F, the video signals received are synthesized and the synthesized video signals are sent to, for example, the first display device that may be the color LCD panel 25F.

The video signals output from the TV tuner 11, the DVD player 12 and the navigation system 13 are also sent to a selector circuit 23R. At the selector circuit 23R, one of the video signals received is selected and the selected video signal is sent to the synthesizing circuit 24R. When a video signal for the menu display is output from the menu signal forming circuit 14, the video signal is also sent to the synthesizing circuit 24R. At the synthesizing circuit 24R, the video signals received are synthesized and the synthesized video signals are sent to the second display device that may be the color LCD panel 25R.

A system control circuit 30 comprises a microcomputer. Light sensitive-elements 31F and 31R for receiving infrared remote control signals are connected to the system control circuit 30. Where these light-sensitive elements 31F and 31R are to be installed will be described later. References 32F and 32R represent wireless infrared remote control transmitters. The remote control transmitters 32F and 32R may be of an identical structure.

A parking signal Sp is sent to the system control circuit 30. The parking signal Sp indicates whether the car is stationary or moving. If the car is automatic, the parking signal Sp may be a parking position signal or a parking brake on signal. In the present embodiment, the parking brake on signal is used as the parking signal Sp.

At the system control circuit 30, first to fourth control signals 30a, 30b, 30c, and 30d are formed according to signals output by the light-sensitive elements 31F and 31R and the parking signal Sp. Of these control signals, the first control signal 30a is sent to the menu signal forming circuit 14 as a signal to select one of the two modes, one for forming video signals for the simplified menu with restricted display content and the other for forming video signals for the standard menu with unrestricted display content.

The second control signal 30b formed in the system control circuit 30 is sent to the switching circuits 21 and 22 to turn the switching circuits on or off. The third and the fourth control signals 30c and 30d formed in the system control circuit 30 are sent to the selector circuits 23R and 23F, respectively, as signals for selecting video signals.

Figure 2:
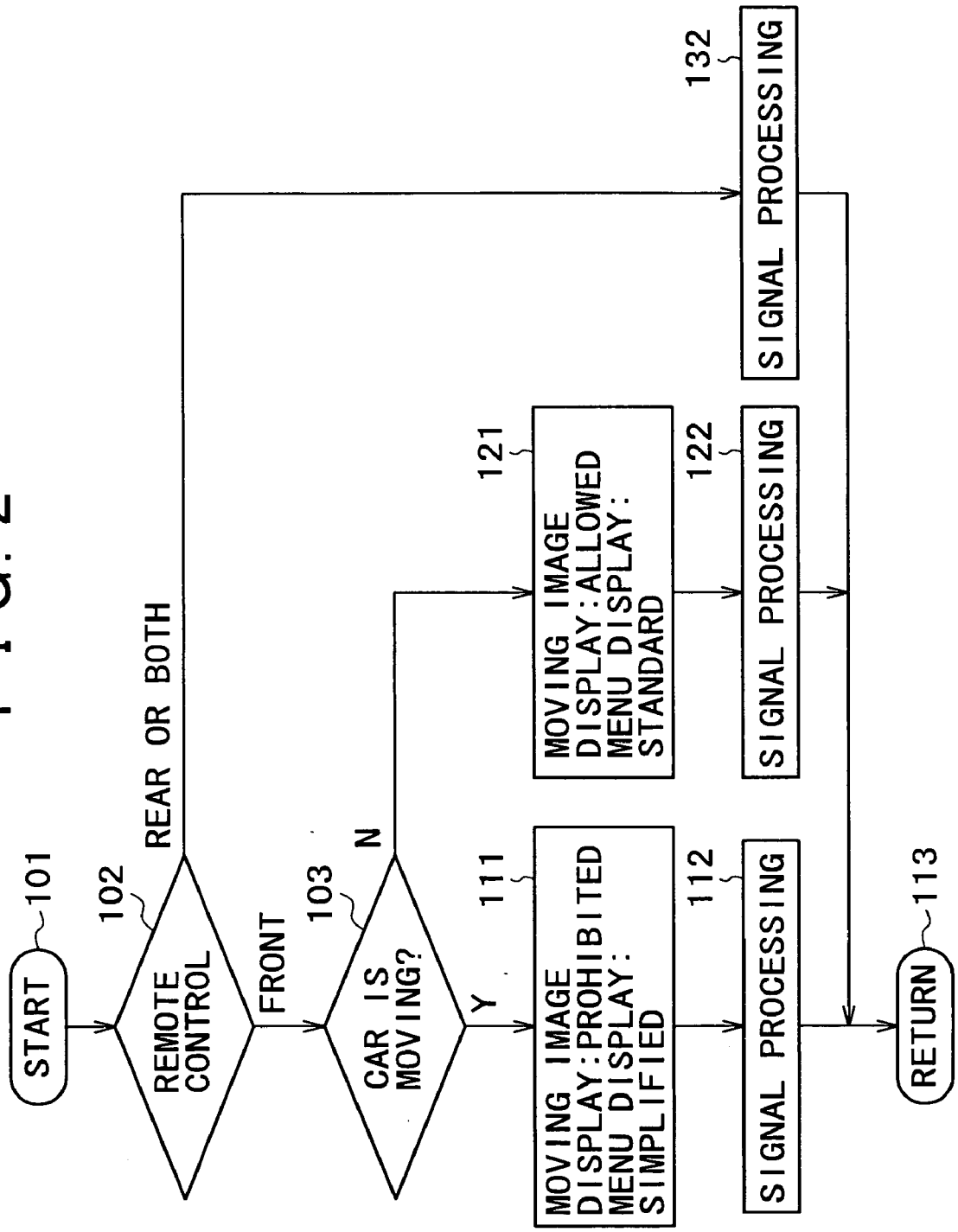
FIG. 2 is a flowchart showing an embodiment of the invention.

The microcomputer included in the system control circuit 30 comprises, for example, a display control routine 100 as shown in FIG. 2. The details of the display control routine 100 will be described later. The display control routine 100 is executed when the remote control transmitter 32F or 32R is operated, that is, when a remote control signal is output from the light-sensitive element 31F or 31R. Shown in FIG. 2 is only a part of the display control routine 100 relevant to the present invention.

Figure 3:
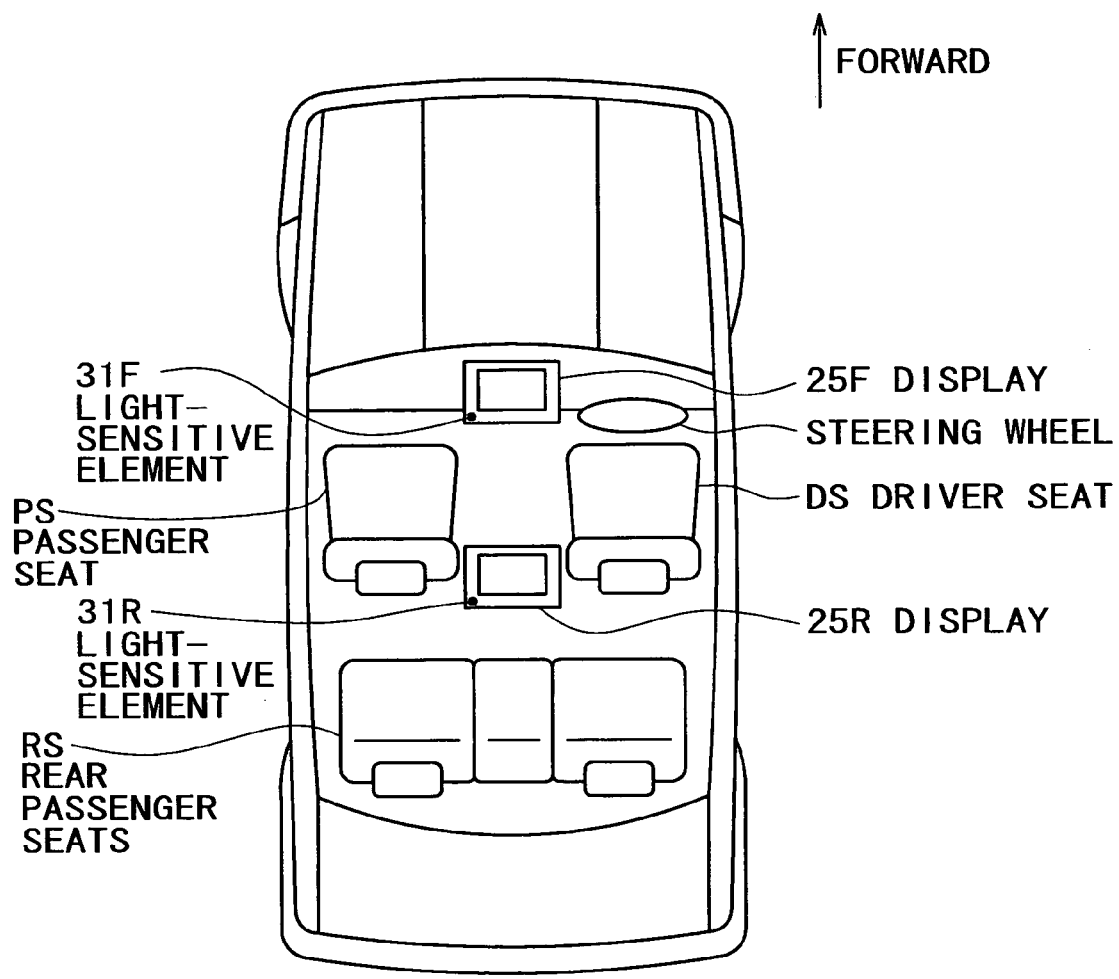
FIG. 3 is a plan view for explaining the invention.
Figure 4:
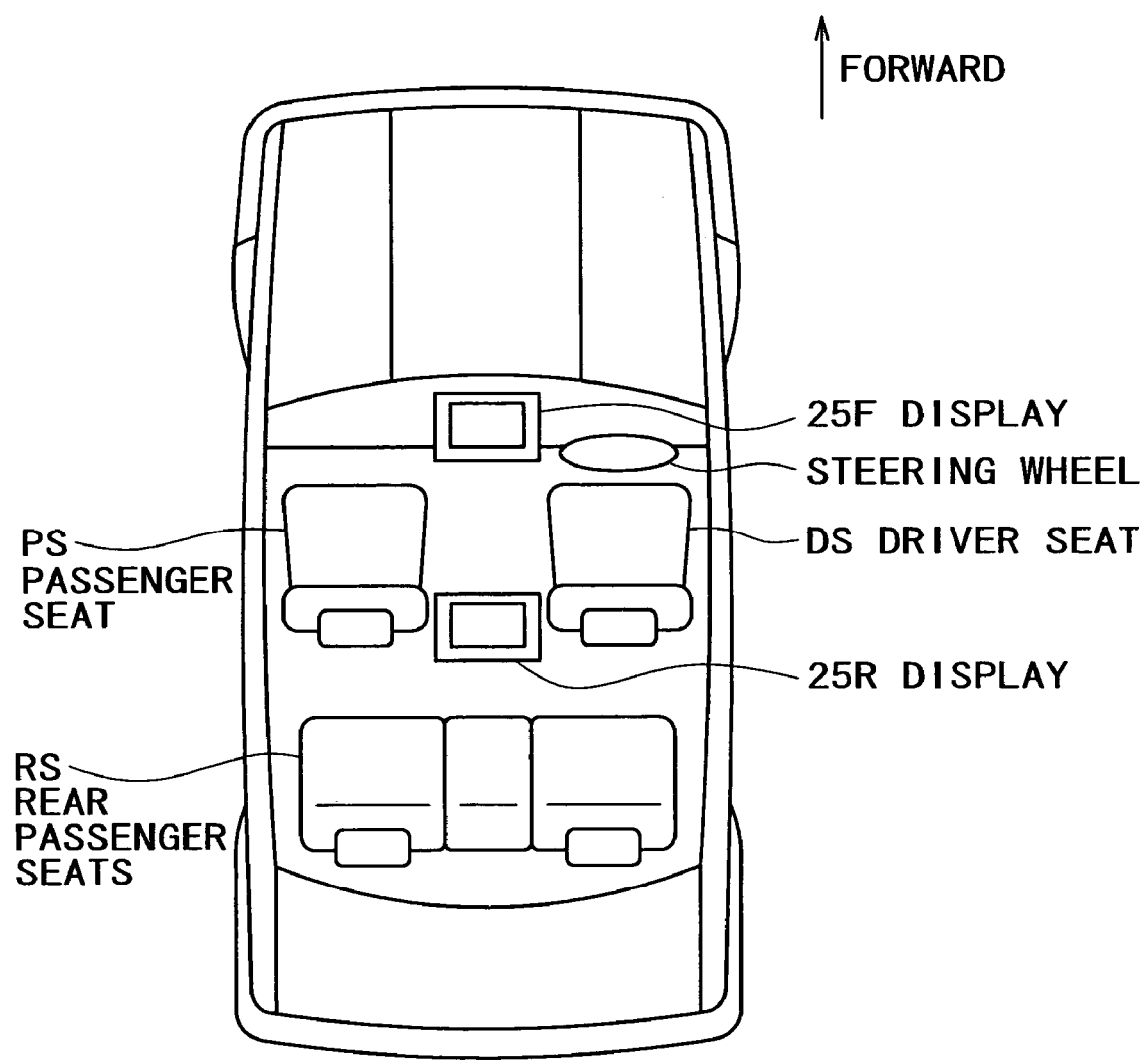
FIG. 4 is a plan view showing an example of a car interior.

FIG. 3 is a plan view showing an example of a car interior equipped with the video system described above. The first color LCD panel 25F is installed in about the center of the dashboard. The location of the first color LCD panel 25F allows the driver in the driver seat DS and the passenger in the passenger seat PS to watch the image displayed on the first color LCD panel 25F. The second color LCD panel 25R is installed between the passenger seat PS and the driver seat DS, in the vicinity of the backrests of the two seats. The location of the second color LCD panel 25R allows the passengers in the rear passenger seats RS to watch the image displayed on the second color LCD panel 25R.

The light-sensitive element 31F is installed on the front of the housing of the color LCD panel 25F, and the light-sensitive element 31R is installed on the front of the housing of the color LCD panel 25R.

[2] Operation of the Embodiment

When the remote control transmitter 32F or 32R is operated, a remote control signal is output from the light-sensitive element 31F or 31R, causing the display control routine 100 shown in FIG. 2 to be executed in the system control circuit 30. At this time, the display control routine 100 determines which of the remote control transmitters 32F and 32R has been operated and, depending on the result of the determination, controls the display on either the color LCD panel 25F or the color LCD panel 25R.

When the driver in the driver seat DS or the passenger in the passenger seat PS operates the remote control transmitter 32F, for example, the remote control transmitter 32F is pointed to the first color LCD panel 25F. In this case, the light-sensitive element 31F receives infrared light emitted from the remote control transmitter 32F, but the light-sensitive element 31R does not. When a passenger in the rear passenger seats RS operates the remote control transmitter 32R, the remote control transmitter 32R is pointed to the second color LCD panel 25R, that is, pointed forward. In this case, infrared light emitted from the remote control transmitter 32R is received by the light-sensitive element 31R, but the infrared light also reaches the first color LCD panel 25F causing the light-sensitive element 31F to also receive the infrared light.

Therefore, when a remote control signal is output only from the light-sensitive element 31F, it is known that the remote control transmitter 32F has been operated by the driver in the driver seat DS or the passenger in the passenger seat PS (that is, the first color LCD panel 25F is being operated). When a remote control signal is output only from the light-sensitive element 31R and also when a remote control signal is output from both the light-sensitive elements 31F and 31R, it is known that the remote control transmitter 32R has been operated by a passenger in the rear passenger seats RS (that is, the second color LCD 25R is being operated).

Based on what is described above, the display control routine 100 determines which one of the remote control transmitters 32F and 32R has been operated and then controls the display on the color LCD panel 25F or on the color LCD panel 25R as described in the following.

[2-1] When the Remote Control Transmitter 32F is Operated While the Car is Moving When the remote control transmitter 32F is operated, a remote control signal is output from the light-sensitive element 31F and the display control routine 100 in the system control circuit 30 starts execution from step 101. Next, in step 102, it is determined which one of the light-sensitive elements 31F and 31R output the remote control signal that caused the display control routine 100 to start execution.

Being described now is a case in which a remote control signal is output only from the light-sensitive element 31F (a case in which the remote control transmitter 32F is operated) so that the execution advances from step 102 to step 103. In step 103, whether the car is moving or stationary is determined by checking the parking signal Sp.

In the present case, the car is moving so that the execution advances from step 103 to step 111. In step 111, the switching circuits 21 and 22 are set to the off side and the menu signal forming circuit 14 is set to a mode for forming video signals for the simplified menu. The execution then advances to step 112. In step 112, signal processing demanded by the operation of the remote control transmitter 32F that caused the display control routine 100 to start execution is performed.

If the processing demanded by the operation of the remote control transmitter 32F that caused the display control routine 100 to start execution is selecting one of the TV tuner 11, the DVD player 12 and the navigation system 13, the selector circuit 23F is controlled to perform the demanded processing. At this time, however, the switching circuits 21 and 22 are on the off side. Therefore, even if a video signal output from the TV tuner 11 or the DVD player 12 is selected, in other words, even if a moving image is selected, the moving image is not displayed on the color LCD panel 25F. (For example, the image displayed at the instant when the TV tuner 11 or the DVD player 12 is selected may be memorized and the memorized image may be displayed as a still image.)

In a case where a video signal output from the navigation system 13 is selected by the selector circuit 23F, the video signal (a moving image) is sent to the color LCD panel 25F as it is to allow the moving image that may be a road map to appear on the color LCD panel 25F. In this case, the menu displayed for navigation is a simplified menu. The map displayed does not include descriptive text for locations and facilities (sightseeing spots, parking lots, hospitals, etc.) shown on the map.

When the signal processing demanded by the operation of the remote control transmitter 32F that caused the display control routine 100 to start execution is finished in step 112, the display control routine 100 is terminated in step 113.

As described above, when the remote control transmitter 32F is operated while the car is moving, in other words, when the driver in the driver seat DS or the passenger in the passenger seat PS operates the remote control transmitter 32F while the car is moving, displaying a moving image on the color LCD panel 25F is prohibited and, for menu display, only the simplified menu can be displayed. A map displayed in this state does not include descriptive text for locations and facilities shown on the map.

[2-2] When the Remote Control Transmitter 32F is Operated While the Car is Stationary In this case, too, the display control routine 100 starts execution from step 101 and advances to step 102, then to step 103. Since the car is stationary in this case, the execution advances from step 103 to step 121.

In step 121, the switching circuits 21 and 22 are set to the on side and the menu signal forming circuit 14 is set to a mode for forming video signals for the standard menu. The execution then advances to step 122. In step 122, the signal processing demanded by the operation of the remote control transmitter 32F that caused the display control routine 100 to start execution is performed.

If the processing demanded by the operation of the remote control transmitter 32F that caused the display control routine 100 to start execution is selecting one of the TV tuner 11, the DVD player 12 and the navigation system 13, the selector circuit 23F is controlled to perform the demanded processing. At this time, the switching circuits 21 and 22 are on the on side. Therefore, it is possible to select a video signal output from the TV tuner 11, the DVD player 12 or the navigation system 13 and have a moving image or a map based on the selected video signal displayed on the color LCD panel 25F. In this state, it is possible to display the standard menu. (A map displayed in this state includes descriptive text for locations and facilities shown on the map).

When the signal processing demanded by the operation of the remote control transmitter 32F that caused the display control routine 100 to start execution is finished in step 122, the display control routine 100 is terminated in step 113.

As described above, when the remote control transmitter 32F is operated while the car is stationary, in other words, when the driver in the driver seat DS or the passenger in the passenger seat PS operates the remote control transmitter 32F while the car is stationary, no restriction is imposed on the display on the color LCD panel 25F. As a result, it is possible to display the standard menu. A map displayed in this state includes descriptive text for locations and facilities shown on the map.

[2-3] When the Remote Control Transmitter 32R is Operated While the Car is Moving or Stationary In this case, too, the display control routine 100 in the system control circuit 30 starts execution from step 101 and advances to step 102. The execution then advances from step 102 to step 132, since, in the present case, a remote control signal is output from the light-sensitive element 31R (and also 31F) (a case where the remote control transmitter 32R is operated).

In step 132, the signal processing demanded by the operation of the remote control transmitter 32R that caused the display control routine 100 to start execution is performed. If the processing demanded by the operation of the remote control transmitter 32R that caused the display control routine 100 to start execution is selecting one of the TV tuner 11, the DVD player 12 and the navigation system 13, the selector circuit 23R is controlled to take out a video signal from the TV tuner 11, the DVD player 12, or the navigation system 13, causing a moving image or a map based on the selected video signal to be displayed on the color LCD panel 25R. In this state, for menu display, the standard menu is displayed. A map displayed in this state includes descriptive text for locations and facilities shown on the map.

When the signal processing demanded by the operation of the remote control transmitter 32R that caused the display control routine 100 to start execution is finished in step 122, the display control routine 100 is terminated in step 113. As described above, when a passenger in the rear passenger seats RS operates the remote control transmitter 32R, a full-content display is allowed on the color LCD panel 25R whether the car is moving or stationary. In this state, it is possible to display the standard menu or a map inclusive of descriptive text for locations and facilities shown on the map on the color LCD panel 25R.

[3] Conclusion

The in-car video system described above has a system control circuit 30. The system control circuit 30 includes a display operating state detecting means to detect an operating state of the first color LCD panel 25F or the second color LCD panel 25R and a car's moving/stationary state detecting means to detect whether the car is in a moving state or a stationary state. When the car's moving/stationary state detecting means detects that the car is in a moving state and the display operating state detecting means detects an operating state of the first color LCD panel 25F, the content of the display on the first color LCD panel 25F is restricted to prevent the display from being detrimental to safe driving. When the car is stationary, the content of the display is not restricted at all.

When a passenger in the rear passenger seats RS operates the remote control transmitter 32R, the display on the color LCD panel 25F is not affected so that such an operation is not detrimental to safe driving.

The color LCD panels 25F and 25R can be controlled independently of each other using the remote control transmitter 32F or 32R. When one of the remote control transmitters 32F and 32R is operated, which one of them has been operated can be determined unerringly. The remote control transmitters 32F and 32R may be of an identical structure and the driver and passengers of the car can use the two remote control transmitters without being required to distinguish them. Furthermore, it is possible to use either of the two remote control transmitters commonly from the driver seat DS, the passenger seat PS and the rear passenger seats RS.

The parking signal Sp described in the foregoing may be produced, for example, by shaping a signal obtained by detecting the rotation of a tire. When such an arrangement is used, it is possible to take out the parking signal Sp from the navigation system 13. As described in the foregoing, when the driver in the driver seat DS or the passenger in the passenger seat PS operates the remote control transmitter 32F, the display of a moving image is prohibited. At such a time, a message reading, for example, "The operation is prohibited while the car is moving" may be displayed or a voice sound or a beep sound may be output as an alarm.

The content of display to be prohibited or restricted when the remote control transmitter 32F is operated by the driver in the driver seat DS or the passenger in the passenger seat PS may be different from what is described in the foregoing. What display to prohibit or restrict may be determined by taking driving safety into consideration. The light-sensitive elements 31F and 31R may be located anywhere as long as they can receive infrared light emitted from the remote control transmitters 32F and 32R and also as long as the light-sensitive element 31R is located posterior to the driver in the driver seat DS and the passenger in the passenger seat PS and anterior to the passengers in the rear passenger seats RS. The color LCD panel 25R may be installed on the back of the backrest of the driver seat DS or the passenger seat PS.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A video system for a car, comprising
a first display device installed in a front part of the car and including a first light-sensitive element for receiving light output from a remote control transmitter;
a second display device installed in a location in the car posterior to the first display device and including a second light-sensitive element for receiving light output from a remote control transmitter; and
a control section operable to control displays on the first display device and the second display device according to output signals from the first light-sensitive element and the second light-sensitive element, the control section including
a display operation detecting unit operable to detect an operating state of the first display device and the second display device according to the output signals of the first light-sensitive element and the second light-sensitive element; and
a moving/stationary state detecting unit operable to detect whether the car is in a moving state or a stationary state,
wherein, when the car is in the moving state and the operating state of the first display device is detected, control is effected to restrict the display on the first display device.

2. A video system for a car, comprising
a first display device installed in a front part of the car and including a first light-sensitive element for receiving remote control light output from a remote control transmitter;
a second display device installed in a location in the car posterior to the first display device and including a second light-sensitive element for receiving remote control light output from a remote control transmitter; and
a control section operable to control displays on the first display device and the second display device according to output signals from the first light-sensitive element and the second light-sensitive element, wherein
when a remote control signal is output only from the first light-sensitive element while the car is moving, the control section imposes restrictions on the display on the first display device,
when a remote control signal is output only from the first light-sensitive element while the car is stationary, the control section removes the restrictions on the display on the first display device, and
when a remote control signal is output from the second light-sensitive element, the control section effects control to display a result of signal processing performed in accordance with the remote control signal on the second display device.

3. A video system for a car, comprising
a first light-sensitive element installed in a location anterior to seats in a front part of the car and operable to receive light output from a first remote control transmitter,
a second light-sensitive element installed in a location in the car posterior to the first light-sensitive element and operable to receive light output from a second remote control transmitter;
a first display device installed in a location in the car anterior to the front seats;
a second display device installed in a location in the car posterior to the first display device; and
a control section operable to control displays on the first display device and the second display device according to output signals from the first light-sensitive element and the second light-sensitive element, wherein
when a remote control signal is output only from the first light-sensitive element while the car is moving, the control section imposes restrictions on the display on the first display device, when a remote control signal is output only from the first light-sensitive element while the car is stationary, the control section removes the restrictions on the display on the first display device, and when a remote control signal is output from the second light-sensitive element, the control section effects control to display a result of signal processing performed in response to the remote control signal on the second display device.

4. A video system for a car, comprising a first display device installed in a front part of the car and including a first light-sensitive element for receiving light output from a remote control transmitter;

a second display device installed in a location in the car posterior to the first display device and including a second light-sensitive element for receiving light output from a remote control transmitter; and a control section operable to control displays on the first display device and the second display device according to output signals of the first light-sensitive element and the second light-sensitive element, the control section including display operation detecting means for detecting an operating state of the first display device and the second display device according to the output signals of the first light-sensitive element and the second light-sensitive element; and moving/stationary state detecting means for detecting whether the car is in a moving state or a stationary state, wherein, when the car is in the moving state and the operating state of the first display device is detected, control is effected to restrict the display on the first display device.

5. A method of controlling a video system in a car having a first display device installed in a front part of the car and including a first light-sensitive element for receiving light output from a remote control transmitter, and a second display device installed in a location in the car posterior to the first display device and including a second light-sensitive element for receiving light output from a remote control transmitter, the method comprising:

detecting output signals from the first light-sensitive element and the second light-sensitive element;

detecting an operating state of the first display device and the second display device according to the output signals from the first light-sensitive element and the second light-sensitive element;

detecting whether the car is in a moving state or a stationary state; and restricting the display on the first display device when the car is in the moving state and the operating state of the first device is detected.

6. A method of controlling a video system in a car having a first display device installed in a front part of the car and including a first light-sensitive element for receiving light output from a remote control transmitter, and a second display device installed in a location in the car posterior to the first display device and including a second light-sensitive element for receiving light output from a remote control transmitter, the method comprising:

detecting output signals from the first light-sensitive element and the second light-sensitive element;

detecting whether the car is in a moving state or a stationary state;

restricting the display on the first display device when the car is in the moving state and a remote control signal is output only from the first light-sensitive element;

removing the restrictions on the display on the first display device when the car is in the stationary state and a remote control signal is output only from the first light-sensitive element; and displaying on the second display device a result of signal processing performed in accordance with a remote control signal when the remote control signal is output from the second light-sensitive element.

7. A method of controlling a video system in a car having a first light-sensitive element installed in a location anterior to seats in a front part of the car and operable to receive light output from a first remote control transmitter, a second light-sensitive element installed in a location in the car posterior to the first light-sensitive element and operable to receive light output from a second remote control transmitter, a first display device installed in a location in the car anterior to the front seats, and a second display device installed in a location in the car posterior to the first display device, the method comprising:

detecting output signals from the first light-sensitive element and the second light-sensitive element;

detecting whether the car is in a moving state or a stationary state;

restricting the display on the first display device when the car is in a moving state and a remote control signal is output only from the first light-sensitive element;

removing the restrictions on the display on the first display device when the car is in the stationary state and the remote control signal is output only from the light-sensitive element; and displaying on the second display device a result of signal processing performed in response to a remote control signal when the remote control signal is output from the second light-sensitive element.

* * * * *

UNITED STATES PATENT AND TRADEMARK OFFICE
CERTIFICATE OF CORRECTION

PATENT NO.       : 7,123,131 B2
APPLICATION NO.  : 10/959464
DATED            : October 17, 2006
INVENTOR(S)      : Hiroyuki Arai It is certified that error appears in the above-identified patent and that said Letters Patent is hereby corrected as shown below:

In Column 3, Line 29, "Light sensitive-elements" should read --Light-sensitive elements--;

In Column 6, Line 53, "122" should read --132--.

Signed and Sealed this

Seventh Day of August, 2007

JON W. DUDAS
*Director of the United States Patent and Trademark Office*